United States Patent [19]

Tanimoto et al.

[11] Patent Number: 4,586,808
[45] Date of Patent: May 6, 1986

[54] OPTICAL SYSTEM DRIVE FOR IMAGE FORMATION APPARATUS

[75] Inventors: Yasufumi Tanimoto, Kanagawa; Junji Watanabe, Yokohama; Toshiyuki Sogo, Kanagawa, all of Japan

[73] Assignee: Tokyo Shibaura Denki Kabushiki Kaisha, Kawasaki, Japan

[21] Appl. No.: 712,929

[22] Filed: Mar. 15, 1985

Related U.S. Application Data

[63] Continuation of Ser. No. 388,174, Jun. 14, 1982, abandoned.

[30] Foreign Application Priority Data

| Jun. 18, 1981 | [JP] | Japan | 56-94901 |
| Jun. 18, 1981 | [JP] | Japan | 56-89829[U] |
| Jun. 25, 1981 | [JP] | Japan | 56-98850 |
| Jul. 6, 1981 | [JP] | Japan | 56-104414 |
| Jul. 14, 1981 | [JP] | Japan | 56-104338[U] |

[51] Int. Cl.$^4$ .......................................... G03G 15/00
[52] U.S. Cl. ................................ 355/8; 355/14 C; 318/696
[58] Field of Search ............... 355/8, 14 R, 14 C, 55, 355/56, 57; 318/696

[56] References Cited

U.S. PATENT DOCUMENTS

| 3,877,807 | 4/1975 | Kurita | 355/66 |
| 4,145,643 | 3/1979 | Maeda et al. | 318/696 |
| 4,211,482 | 7/1980 | Arai et al. | 355/8 |
| 4,241,301 | 12/1980 | Pohlig | 318/696 |
| 4,253,052 | 2/1981 | Meier | 318/696 |
| 4,287,461 | 9/1981 | Promis et al. | 355/8 X |

FOREIGN PATENT DOCUMENTS

| 2042903 | 3/1972 | Fed. Rep. of Germany | 318/696 |
| 2032649 | 5/1980 | United Kingdom | 318/341 |

OTHER PUBLICATIONS

*Sigma Stepping Motor Handbook,* pp. 1–61, Braintree, Mass.

*IBM Technical Disclosure Bulletin,* vol. 6, No. 10, Mar. 1964, pp. 53–55, Scalone et al., "Incrementing Positioning Control Circuit".

Primary Examiner—A. T. Grimley
Assistant Examiner—J. Pendegrass
Attorney, Agent, or Firm—Cushman, Darby & Cushman

[57] ABSTRACT

An optical system drive device for an image formation apparatus has a drive mechanism for reciprocally driving an exposure unit, and a pulse motor for supplying pulses to the drive mechanism. The pulses to be supplied to the pulse motor are stored in advance in a ROM. In accordance with either document size or required equal size, reduced scale or enlarged copying mode, a microprocessor reads out a predetermined control pulse from the ROM and applies it to the pulse motor, thereby controlling acceleration, constant velocity drive and deceleration of the pulse motor.

1 Claim, 36 Drawing Figures

F I G. 11
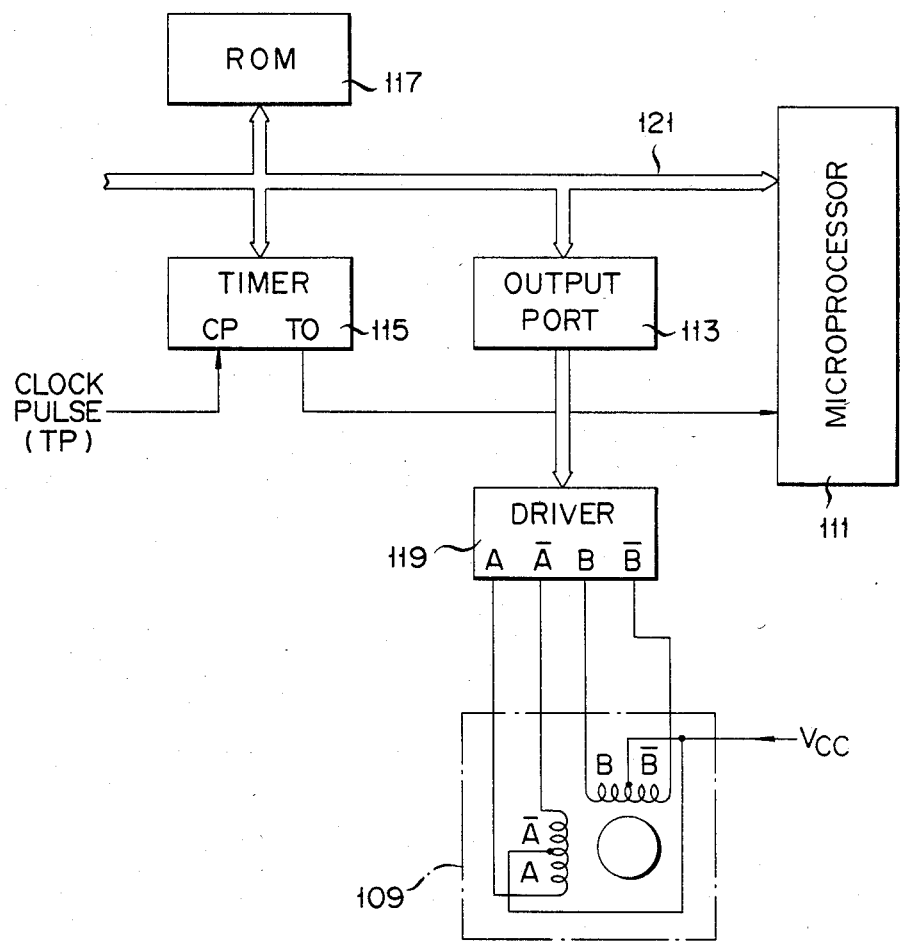

FIG. 12A PULSE
FIG. 12B PHASE A
FIG. 12C PHASE B
FIG. 12D PHASE Ā
FIG. 12E PHASE B̄

| DATA D0 (T0/TP) | DATA D1 (T1/TP) | DATA D2 (T2/TP) | ———— | DATA Dn (Tn/TP) |
|---|---|---|---|---|

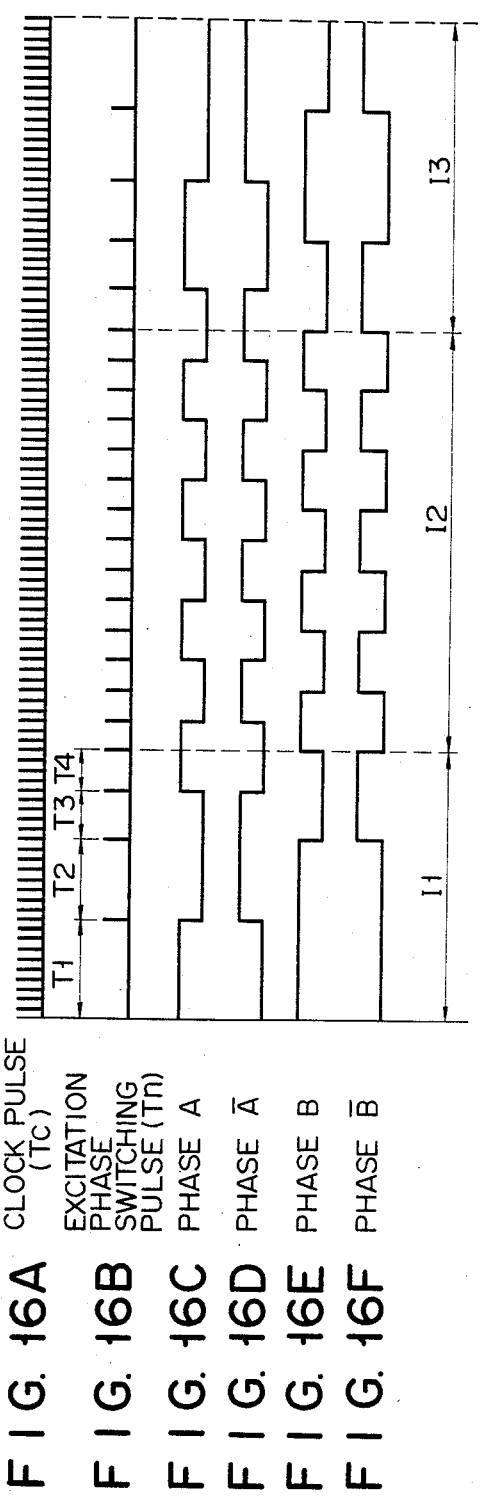

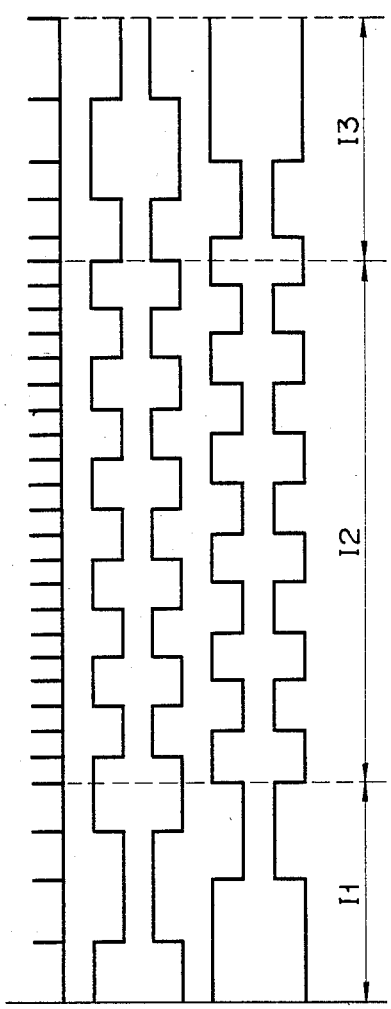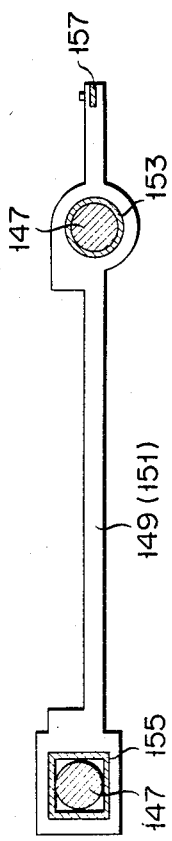

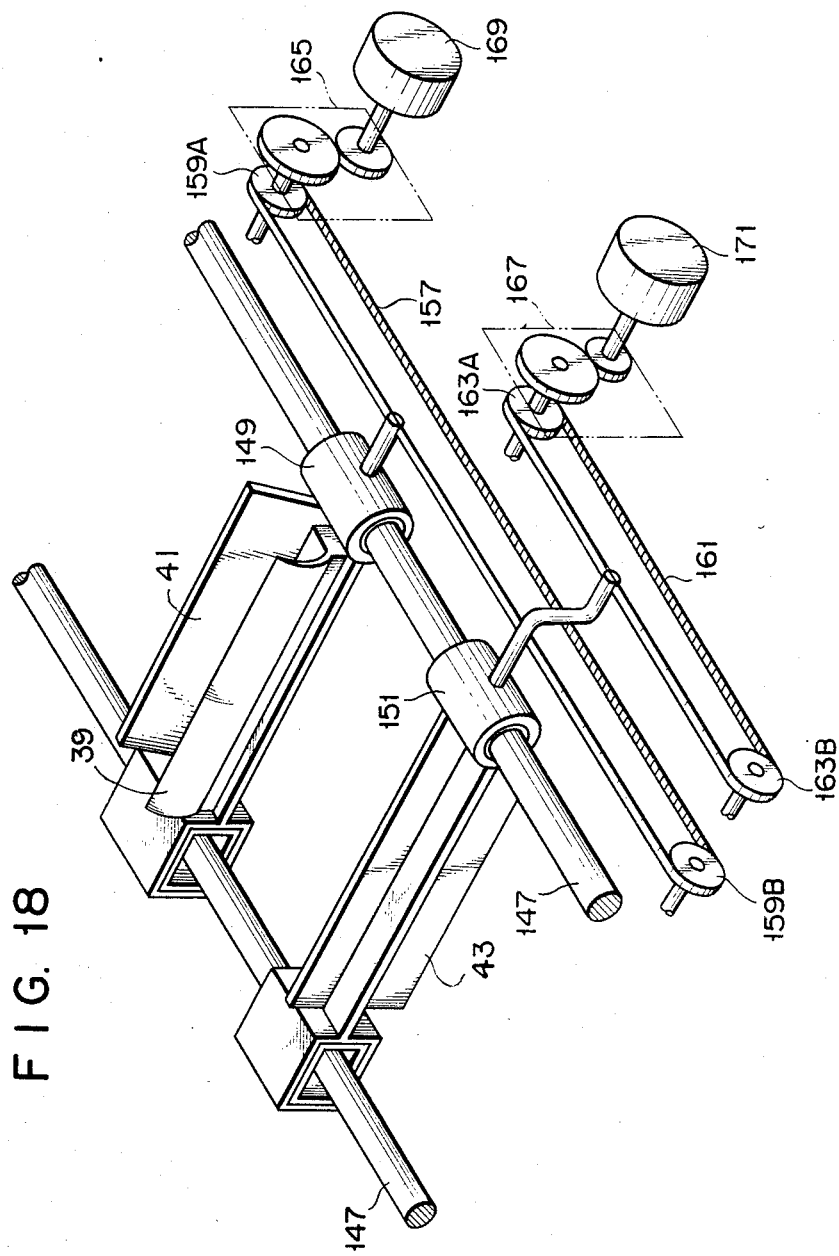

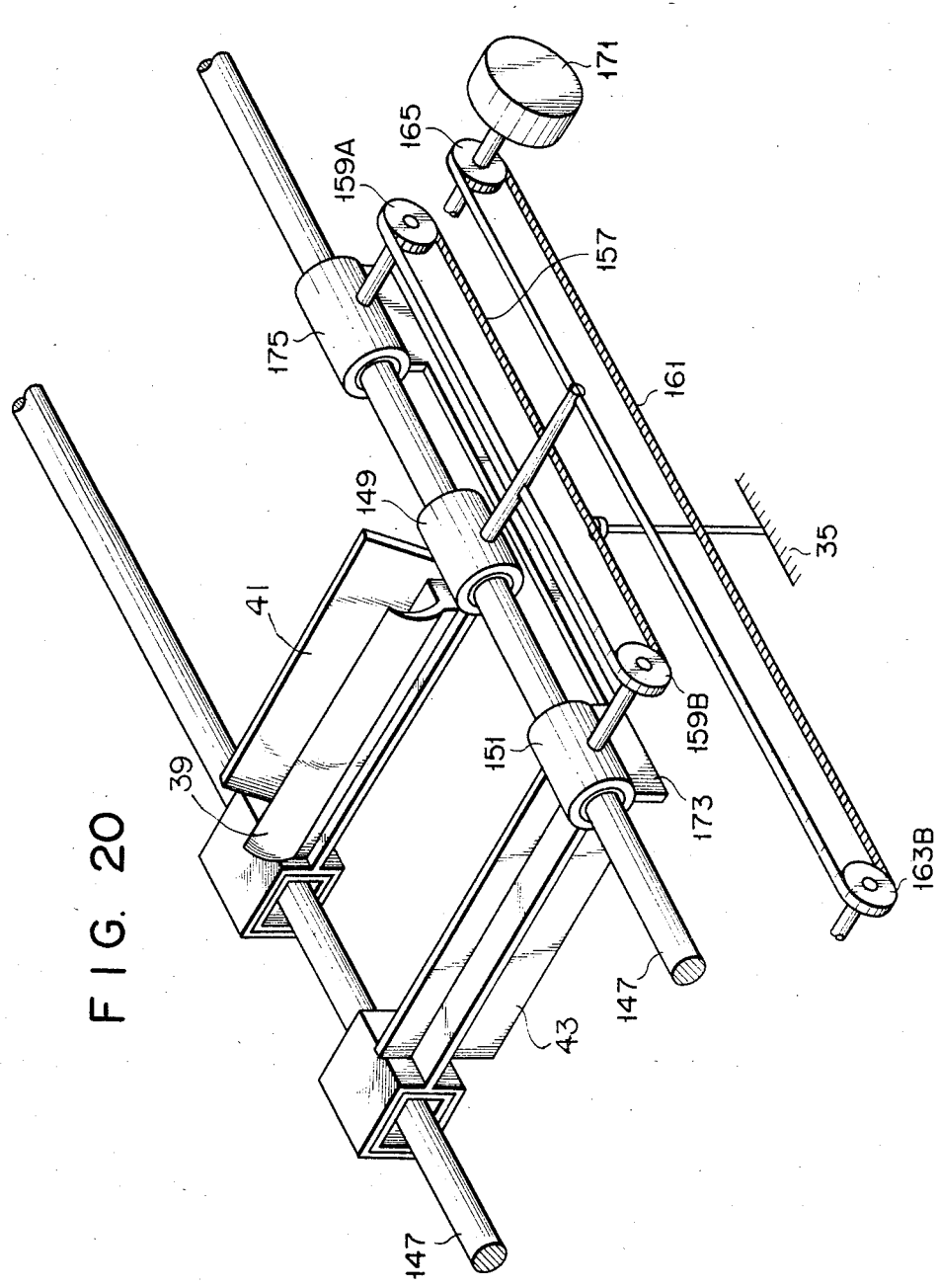

OPTICAL SYSTEM DRIVE FOR IMAGE FORMATION APPARATUS

This is a continuation, of application Ser. No. 388,174, filed June 14, 1982 and now abandoned.

BACKGROUND OF THE INVENTION

The present invention relates to an optical system drive device for reciprocally driving an optical system of, for example, an electronic copying machine of the stationary document table type.

An electronic copying machine of the stationary document table type is known in which an optical system having an exposure lamp, mirrors or the like is reciprocally driven along a fixed document table to scan the document set thereon. A conventional optical drive device for such a copying machine uses a plurality of electromagnetic clutches which are alternately turned on and off to reciprocally drive the optical system.

FIG. 1 shows an example of a conventional optical system drive device. Referring to FIG. 1, a pair of carriage guide shafts 1 are mounted to a copying machine main body (not shown) parallel to each other. First and second carriages 3 and 5 are reciprocally movably mounted on these carriage guide shafts 1. A lamp 7 and a first mirror 9 are mounted on the first carriage 3, while a second mirror 11 is mounted on the second carriage 5. A document 13 is set on a stationary document table (not shown). Light from the lamp 7 is radiated onto the document 13, and light reflected by the document 13 becomes incident on a lens 15 through the first mirror 9 and the second mirror 11. In order to scan the document 13 by moving the first and second carriages 3 and 5 while keeping constant the length of the optical path leading from the first mirror 9 to the lens 15, an idler 17 is mounted on the second carriage 5. A wire 19 is wound around the idler 17. One end of the wire 19 is fixed and the other end thereof is fixed to and biased by, for example, a coil spring 25. The intermediate portion of the wire 19 is fixed to the first carriage 3 and is wound around a wire drum 21. The wire 19 then extends to the idler 17 again through a pulley 23 opposite the wire drum 21. The driving force of a motor 31 is transmitted to the wire drum 21 through various clutches such as a reversible clutch 27 and a speed change clutch 29. Displacement detectors or microswitches 33 are arranged along the carriage guide shafts 1 so as to detect the amount of displacement of the first and second carriages 3 and 5. The optical system of this arrangement is driven by the motor 31 and the clutches 27 and 29. When the microswitch 33 detects the displacement of the first and second carriages 3 and 5, the optical system reciprocally drives the first carriage 3 at a velocity twice that of the second carriage 5.

However, since the displacement of the first and second carriages 3 and 5 is detected by the microswitch 33, many microswitches are required in order to vary the amounts of displacement of the first and second carriages 3 and 5. This results in a complex arrangement and a low detection reliability. Furthermore, every time the clutches 27 and 29 are turned on and off, the first and second carriages 3 and 5 are subject to shock and vibration, resulting in blurring of the reproduced image. In particular, strong vibration is caused during the initialization of the first and second carriages 3 and 5. For this reason, scanning cannot be initiated until this vibration is completely damped, and the preliminary strokes of the first and second carriages 3 and 5 must be lengthened. Accordingly, the overall optical system drive device becomes large in size.

SUMMARY OF THE INVENTION

It is an object of the present invention to provide an optical system drive device for an image formation apparatus which is extremely simple in structure and high in reliability, which is capable of eliminating vibration which may be caused during the initialization of the optical system, and which is capable of displacing the optical system at a velocity faster in the backward movement than in the forward movement.

It is another object of the present invention to provide an optical system drive device for an image formation apparatus which controls the period of pulses supplied to a pulse motor during acceleration so as to eliminate vibration caused upon achieving a constant displacement velocity, so that an accelerating interval may be shortened in length.

It is still another object of the present invention to provide an optical system drive device for an image formation apparatus which uses a pulse motor to selectively drive the optical system at different rotation velocities so as to establish various copying modes such as equal size, reduced scale and enlarged copying modes, thereby achieving an extremely simple structure of the device, and which eliminates the adverse effects of a shock load caused by switching the clutches upon formation of an image.

It is still another object of the present invention to provide an optical system drive device for an image information apparatus which uses a pulse motor to selectively control the amount of rotation of the optical system according to preset pulse motor driving data corresponding to the size of each document, thus achieving an extremely simple structure of the device, and one which is capable of preventing shock or vibration caused during displacement of the optical system.

In order to achieve the above and other objects, there is provided according to the present invention an optical system driving device for an image formation apparatus which reciprocally drives an optical system along a stationary document table to scan a document set thereon, and which forms an image of the document on an image recording medium, comprising:

(a) a drive mechanism for reciprocally driving said optical system;

(b) a pulse motor for supplying power to reciprocally drive said optical system relative to said drive mechanism;

(c) means for generating pulse data for accelerating or decelerating said pulse motor; and (d) drive circuit means for driving said pulse motor in accordance with the pulse data generated by said pulse data generating means.

BRIEF DESCRIPTION OF THE DRAWINGS

Other objects and features of the present invention will be apparent from the following description taken in connection with the accompanying drawings in which:

FIG. 11 is a block diagram showing an example of a control circuit for controlling acceleration, constant speed drive and deceleration of the optical system drive device;

FIGS. 12A through 12E are timing charts explaining the two-phase excitation system for driving the pulse motor;

FIGS. 16A through 16F are timing charts of examples of pulses supplied to the control circuit shown in FIG. 15 for driving the pulse motor in the equal size copying mode;

FIGS. 17A through 17E are timing charts of samples of pulses supplied to the control circuit shown in FIG. 15 for driving the pulse motor in the reduced scale copying mode;

FIG. 18 is a perspective view of an optical system driving device which is used for an image formation apparatus according to yet another embodiment of the present invention, and which drives the optical system drive device in accordance with the document size;

FIG. 19 is a schematic cross-sectional view of the optical system drive device shown in FIG. 18; and FIG. 20 is a perspective view of a modification of the optical system drive device shown in FIG. 18.

DETAILED DESCRIPTION OF THE PREFERRED EMBODIMENTS

Figure 1:
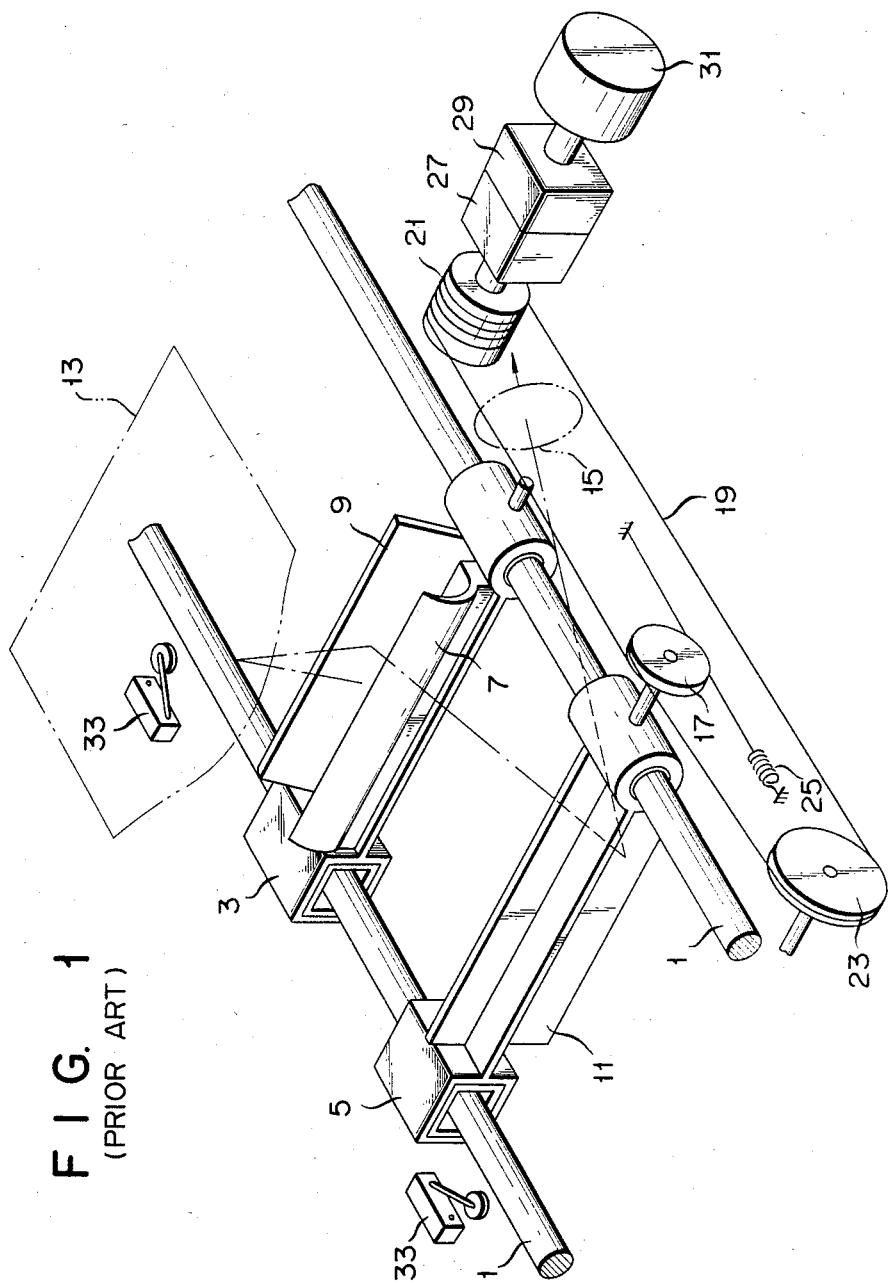
FIG. 1 is a schematic perspective view of a conventional optical system drive device for an image formation apparatus.
Figure 2:
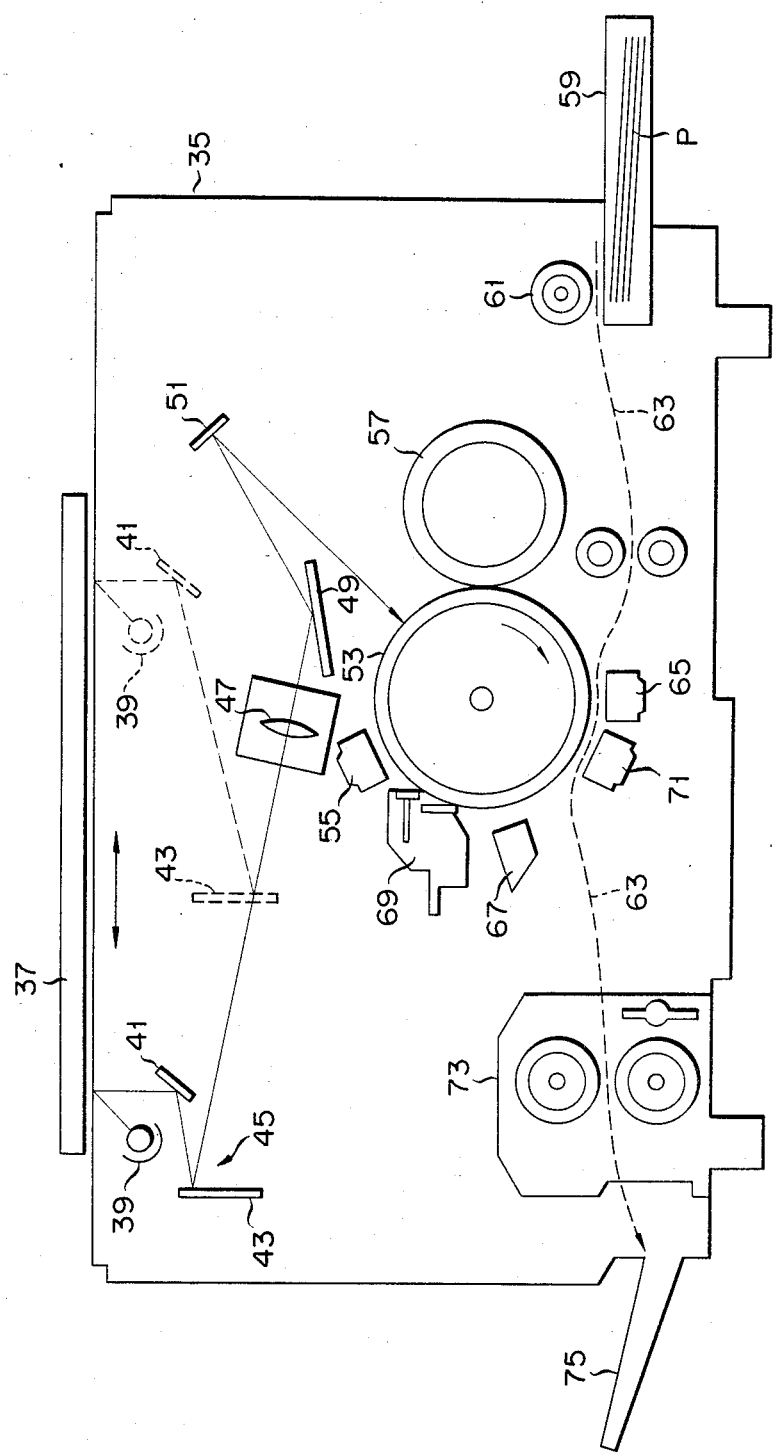
FIG. 2 is a schematic longitudinal sectional view of a copying machine which has an optical system drive device for an image information apparatus according to an embodiment of the present invention.

Referring now to the drawings, wherein like reference numeral designate identical or corresponding parts throughout the several views, and more particularly to FIG. 2 thereof a schematic sectional view of an electronic copying machine of the stationary document table type which uses an optical system drive device for an image formation apparatus according to the present invention is shown. A document table 37 is fixed on the upper surface of a copying machine main body 35. An optical system 45, consisting of an exposure lamp 39 and mirrors 41 and 43, moves reciprocally along the lower surface of the document table 37 in the directions indicated by arrows. During the forward movement of the optical system 45, the document set on the document table 37 is exposed to light or scanned from the exposure lamp 39. In order to achieve a constant length of the optical path, the mirror 43 moves at a velocity half that of the mirror 41. The light reflected by the document is reflected by the mirrors 41 and 43, transmitted through a lens 47, reflected by mirrors 49 and 51, and guided onto a photosensitive drum 53. An image of the document is then formed on the surface of the photosensitive drum 53.

The photosensitive drum 53 rotates in the direction indicated by an arrow. The surface of the photosensitive drum 53 is first sensitized by a sensitizer 55. The image of the document is then slit-exposed to form the electrostatic latent image. Toner is applied to this image at a developing unit 57 so as to visualize the electrostatic latent image and to form a toner image. Recording paper sheets P are housed in a recording paper sheet cassette 59 and are individually picked up by a pickup roller 61. After pick-up, the recording paper sheet P is fed to a transfer unit through a conveyor 63. At the transfer unit, the recording paper sheet P is placed in contact with the surface of the photosensitive drum 53 at the part of a transfer charger 65 so as to transfer the toner image on the photosensitive drum 53 onto the sheet. After image transfer, the photosensitive drum 53 is charge-removed by a charge remover 67. Thereafter, the residual toner on the photosensitive drum 53 is removed by a cleaner 69 to restore its initial state. Meanwhile, after image transfer, the recording paper sheet P is separated from the photosensitive drum 53 by a separating charger 71 and is fed to a fixing unit 73 by the conveyor 63. The transferred image on the recording paper sheet P is thus fixed. The recording paper sheet P is then discharged onto a discharge tray 75. The photosensitive drum 53, sensitizer 55, developing unit 57, conveyor 63, transfer charger 65, charge remover 67, cleaner 69, separating charger 71, fixing unit 73, etc. constitute the main parts of a hard copy reproducing apparatus.

Figure 3:
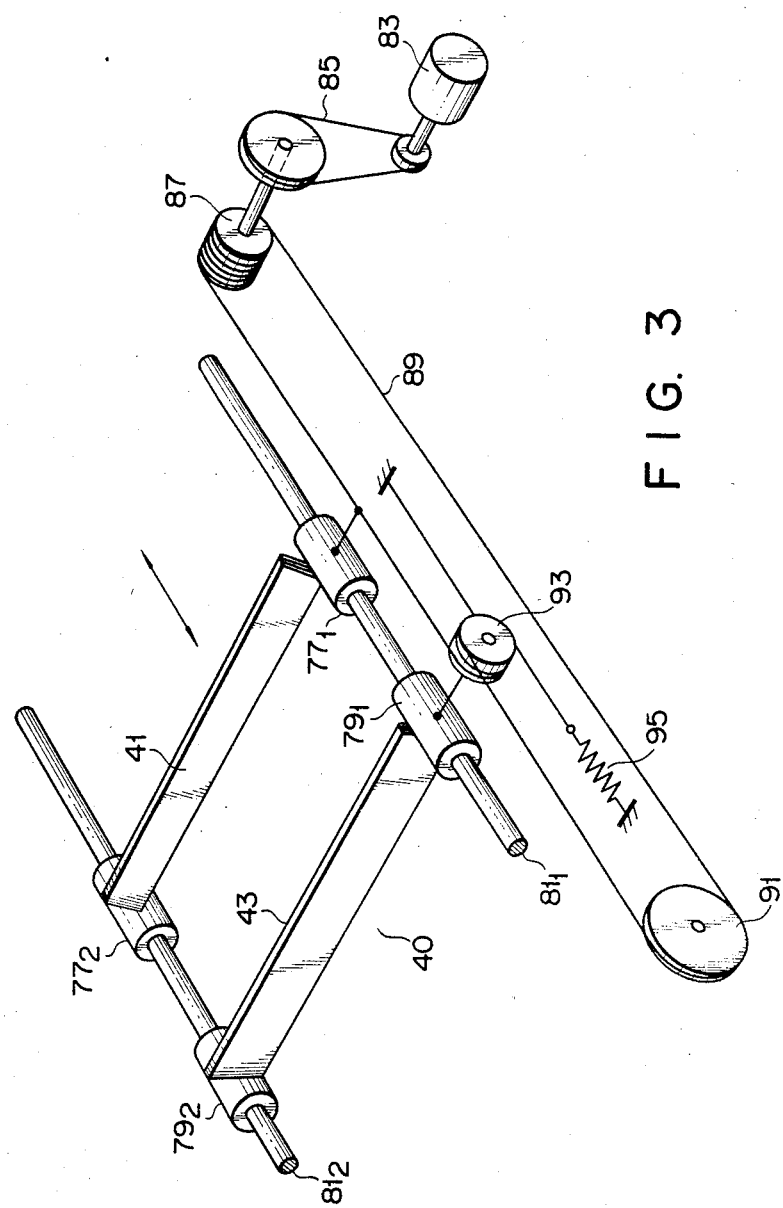
FIG. 3 is a schematic perspective view of the optical system drive device shown in FIG. 2.

FIG. 3 schematically shows a drive mechanism 40 for reciprocally driving the optical system. The ends of mirrors 41 and 43 are supported by carriages $77_1$, $77_2$, $79_1$, and $79_2$, respectively, which are, in turn, guided by rod-shaped guide rails $81_1$ and $81_2$ of circular cross-sectional shapes so that they are horizontally movable in the directions indicated by arrows. A pulse motor 83 drives a wire drum 87 through a reduction mechanism 85. A drive wire 89 is wound around the wire drum 87. One end of the drive wire 89 is fixed through a pulley 91 and an idler 93 to one end of a spring 95, the other end of which is fixed. The other end of the drive wire 89 is fixed in a predetermined position to the idler 93. The idler 93 is rotatably fixed to the carriage $79_1$ supporting the mirror 43. The carriage $77_1$ supporting the mirror 41 is connected to the intermediate portion of the drive wire 89 between the wire drum 87 and the idler 93. The pulse motor 83 is then rotated to move the drive wire 89 wound around the wire drum 87 and to move the mirror 41. The mirror 43 is moved by way of the idler 93, which causes it to move at a velocity half that of the mirror 41 in the same direction.

Control of the moving velocities of the mirrors 41 and 43 is performed by varying the rotation velocity of the pulse motor 83, while control of the direction of movement of the mirrors 41 and 43 is performed by varying the direction of rotation of the pulse motor 83. Although not shown in the drawings, the exposure lamp 39 is also supported through a mounting member on the carriages $77_1$ and $77_2$ which support the mirror 41, so that the exposure lamp 39 is movable together with the mirror 41.

Figure 4:
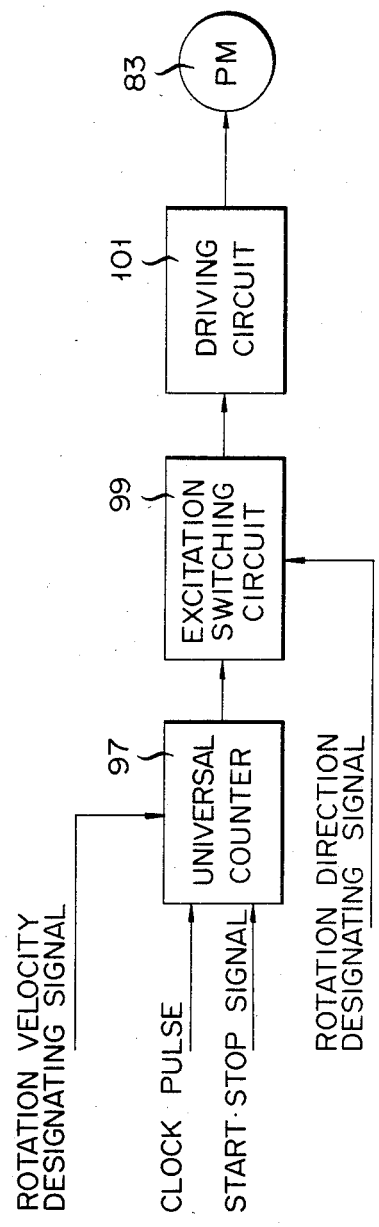
FIG. 4 is a block diagram of a control circuit for the optical system drive device shown in FIG. 2.
Figure 5:
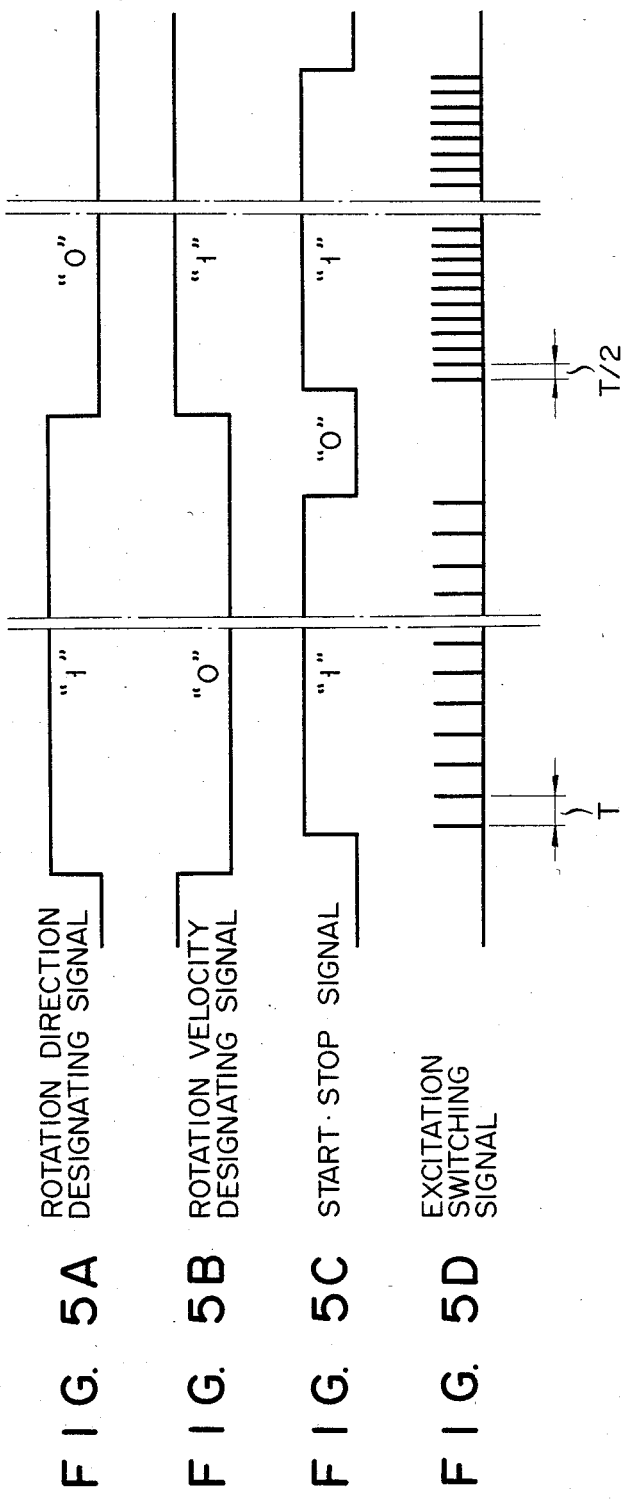
FIGS. 5A through 5D are timing charts of control signals supplied to the control circuit shown in FIG. 4, wherein FIG. 5A corresponds to a rotation direction designating signal, FIG. 5B corresponds to a rotation velocity designating signal, FIG. 5C corresponds to a start stop signal, and FIG. 5D corresponds to an excitation phase switching signal.

FIG. 4 is a block diagram of a control circuit for controlling the operation of the pulse motor 83. The control circuit comprises a universal counter 97 which acts as an excitation phase switching clock pulse generator for generating two types of excitation phase switching clock pulses in response to clock pulses, namely a start/stop pulse and a rotation velocity designating signal for the pulse motor 83 supplied from a main control circuit (not shown) of the copying machine; an excitation phase switching circuit 99 for switching the excited state of the pulse motor 83 in response both to excitation phase switching clock pulses from the universal counter 97 and to the rotation direction designating signal for the pulse motor 83 supplied from the main control circuit; and a driving circuit 101 for driving the pulse motor 83 in response to the output from the excitation phase switching circuit 99. During the forward movement (scanning) of the optical system 45, the rotation direction designating signal shown in FIG. 5A is at logic level "1" representing the forward direction, the rotation velocity designation signal shown in FIG. 5B is at logic level "0" representing a low velocity, and the start stop signal shown in FIG. 5C is at logic level "1" representing a "start". The universal counter 97 then starts counting the clock pulses from the main control circuit and generates an excitation phase switching clock pulse of period T shown in FIG. 5D synchronous with the rotating velocity of the photosensitive drum 53. The excitation phase switching clock pulse is then supplied to an excitation phase switching circuit 99. Since the rotation direction designating signal is at level "1" at this time, the excitation phase switching circuit 99 switches the driving direction of the pulse motor 83 to the forward direction. The driving circuit 101 then drives the pulse motor 83 in the forward direction to start the forward movement (scanning) of the optical system 45. After completing scanning, the start/stop signal shown in FIG. 5C goes to logic level "0" representing a stop and then goes to logic level "1" again to start the backward movement (return operation) of the optical system 45. During the backward movement of the optical system 45, the rotation direction designating signal shown in FIG. 5A is at logic level "0" representing the reverse direction, the rotation velocity signal shown in FIG. 5B is at logic level "1" representing a high velocity, and the start/stop signal shown in FIG. 5C is at logic level "1" representing a "start". The universal counter 97 then starts counting the clock pulses from the main control circuit, and generates an excitation phase switching clock pulse of a period shorter than that of the clock pulse generated during the forward movement as shown in FIG. 5D, for example, a period of T/2. Since the rotation direction designating signal shown in FIG. 5A is at logic level "0" at this time, the excitation phase switching circuit 99 switches the direction of rotation of the pulse motor to the reverse direction. Then, the driving circuit 101 drives the pulse motor 83 in the reverse direction to start the backward movement (return operation) of the optical system 45. Since the period of the excitation switching clock pulse is one half (T/2) that during the forward movement, the pulse motor 83 is rotated at a high velocity (about twice that during the forward movement). Thus, the optical system 45 is returned at a velocity twice that during the forward movement. After completion of the return operation, the start/stop signal goes to logic level "0" to stop the optical system 45.

Figure 6:
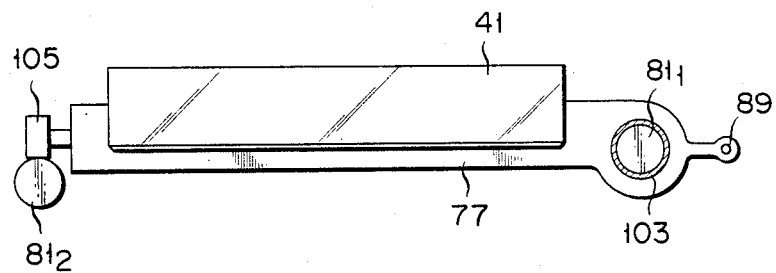
FIG. 6 is a front view showing a modification of a carriage of a drive mechanism for driving the optical system shown in FIG. 3.
Figure 7:
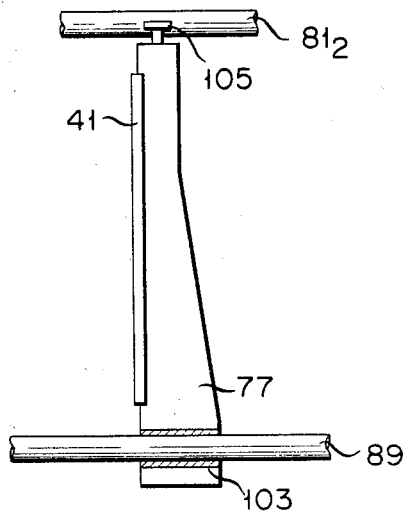
FIG. 7 is a side view showing a modification of the carriage of the drive mechanism for driving the optical system shown in FIG. 3.
Figure 8:
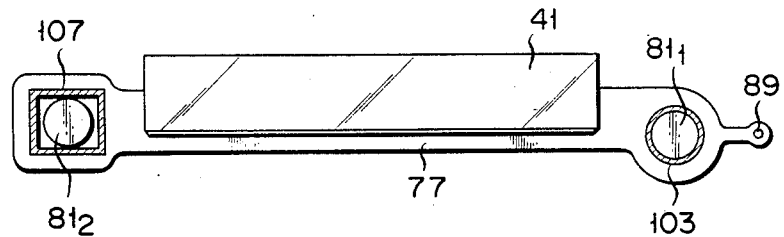
FIG. 8 is a front view of another modification of the carriage of the drive mechanism for driving the optical system shown in FIG. 3.

FIGS. 6, 7 and 8 show modifications of the carriages for supporting the mirrors 41 and 43. Since the carriages of the same configuration are used for both the mirrors 41 and 43, only those for the mirror 41 are shown in the figures. The same reference numerals as those in FIGS. 2 and 3 denote the same parts in FIGS. 6, 7 and 8. FIG. 6 is a front view of the carriage 77, and FIG. 7 is a side view thereof. At one end of the carriage 77 is arranged a guide member 103 through which a guide rail $81_1$ slidably extends. The carriage 77 moves as guided by the guide rail $81_1$. A rotatable roller 105 is arranged at the other end of the carriage 77 to roll on a guide rail $81_2$, thus guiding the movement of the carriage 77.

FIG. 8 is a view showing a modification of the carriage 77 shown in FIG. 6, which is different therefrom only in the structure at the other end. Referring to FIG. 8, at the other end of the carriage 77 is arranged a bushing 107 through which the guide rail $81_2$ extends and which guides the movement of the carriage 77. The bushing 107 regulates the movement of the carriage 77 only in the vertical direction and allows free movement thereof in the transverse direction.

Another embodiment of the present invention will now be described with reference to FIGS. 9 to 13. In this embodiment, as seen from curve C, a period Ti of the excitation phase switching clock pulse is so given in the initial driving period that the driving velocity Vi of the optical system may be a velocity slightly greater than the constant velocity (curve D indicated by the dotted line), or that the gradient $\theta_1$ of the curve C may be greater than the gradient $\theta_2$ of the curve D. As the driving velocity draws near to a constant velocity Vc, the period Ti is made greater than the period Tc at which the constant velocity Vc is reached so as to decrease the velocity Vi. In this manner, overshooting of the optical system and/or vibration caused when the driving speed of the optical system reaches the constant velocity Vc is eliminated. As a result of this, an accelerating interval tc2 from the initial driving period to the time when the driving velocity of the optical system reaches the constant velocity Vc is shortened.

Figure 9:
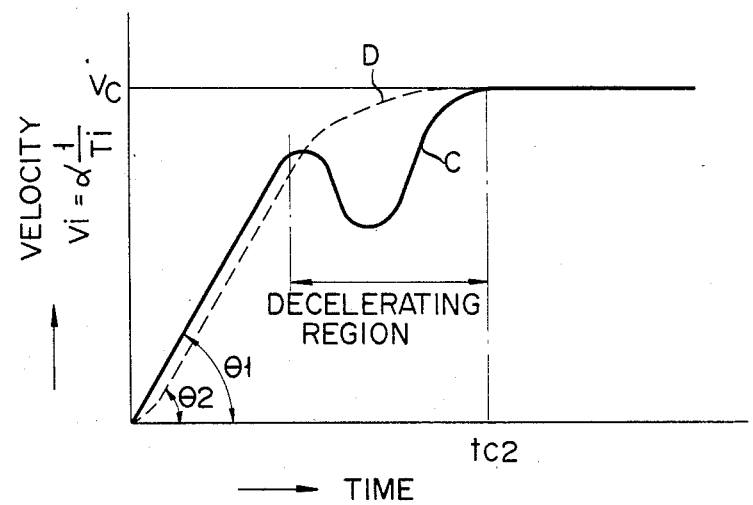
FIG. 9 is a graph showing the rotation velocity in an accelerating interval as a function of time for the purpose of explaining the manner for determining the period of the pulse to be supplied to the pulse motor according to another embodiment of the present invention.
Figure 10:
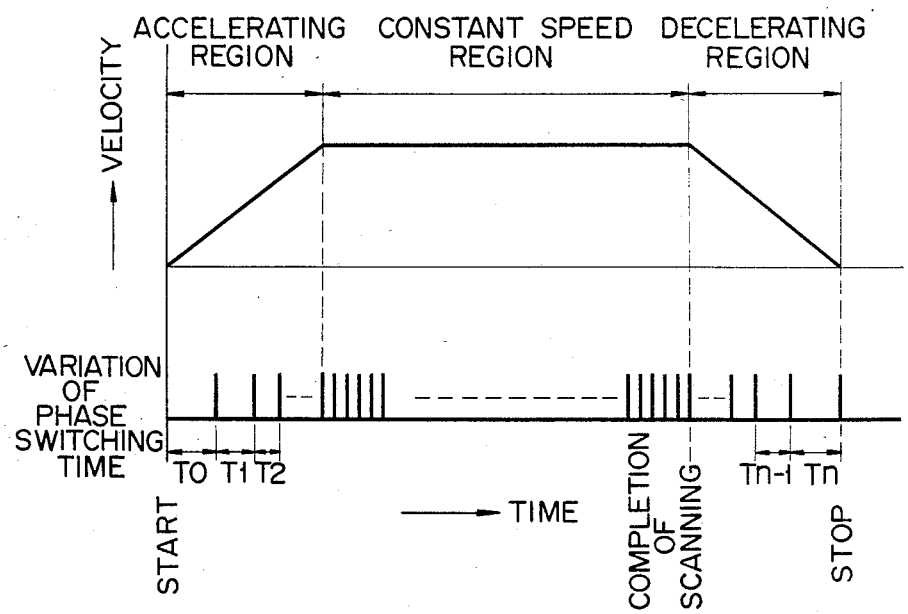
FIG. 10 is a graph showing the relationship between the rotating velocity of the pulse motor and time.

In this embodiment, the driving velocity is accelerated by sequentially stepwise decreasing the period Ti from the start of the initial driving period to T0, T1, T2, etc., as shown in FIG. 10, so that the driving velocity of the optical system may be made synchronous with the rotating velocity of the photosensitive drum when it reaches the constant speed Vc. The period Ti is controlled so as to obtain the velocity characteristics indicated by curve C in FIG. 9. After scanning, the optical system is decelerated from the constant velocity Vc by sequentially stepwise elongating the period Ti, so that the optical system temporarily stops upon completion of its return movement. A pulse motor of a large torque is not required, and therefore a pulse motor of compact size may be used. Acceleration and deceleration may be smoothly performed without causing vibration of the optical system.

Figure 13:
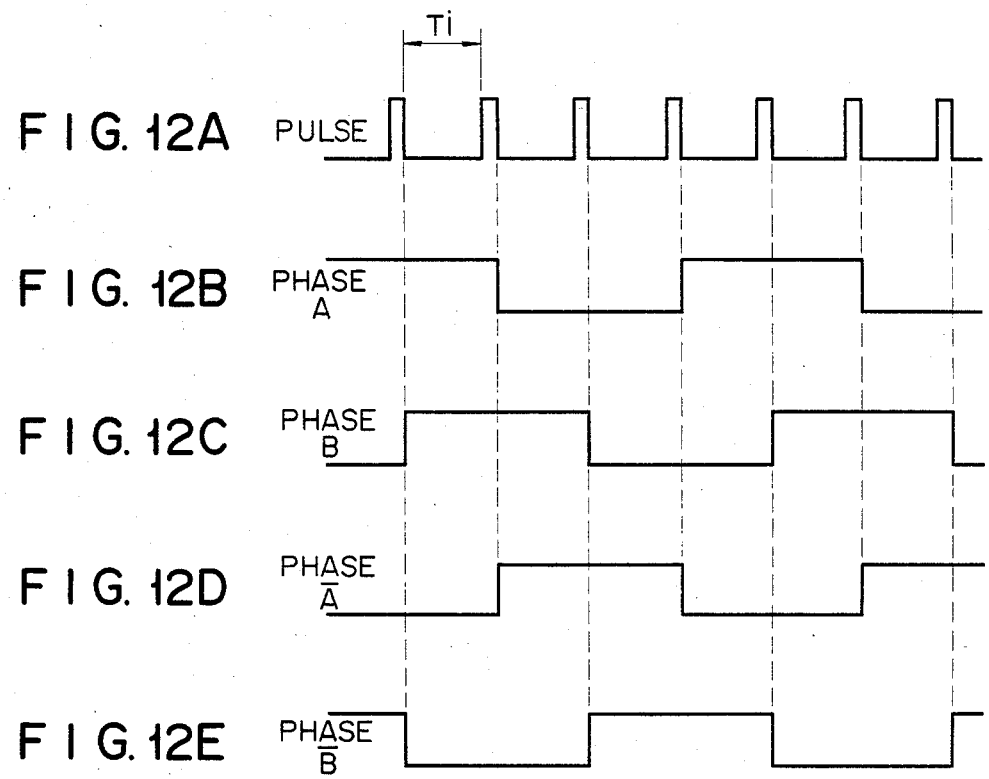
FIG. 13 is a view showing data stored in a ROM in the control circuit shown in FIG. 11.

FIG. 11 shows a control circuit for controlling the driving operation of the pulse motor 109. The control circuit comprises a microprocessor 111 as a main control circuit, an output port 113, a timer 115, a read-only memory (ROM) 117 and a drive circuit 119. The microprocessor 111, the output port 113, the timer 115, and the ROM 117 are connected to each other through a data bus 121. The driving circuit 119 is connected to the output port 113 and drives the pulse motor 109. In this embodiment, the driving circuit 119 is so constructed as to drive the pulse motor 109 by the two-phase excitation method, as shown in the timing charts in FIGS. 12A to 12E. Clock pulses generated by a clock generator (not shown) are supplied to decrement the timer 115. The timer 115 generates a time-out signal which is supplied to the microprocessor 111 as an interrupt request signal. The ROM 117 stores data D0 through Dn, as shown in FIG. 13, for determining the period Ti of the excitation phase switching clock pulse to be supplied to the pulse motor 109. The data D0 to Dn are given by dividing the periods T0, T1, T2, etc. of the excitation phase switching clock pulses shown in FIG. 10 by the period Tp of the clock pulses which are supplied to the timer 115.

Figure 14:
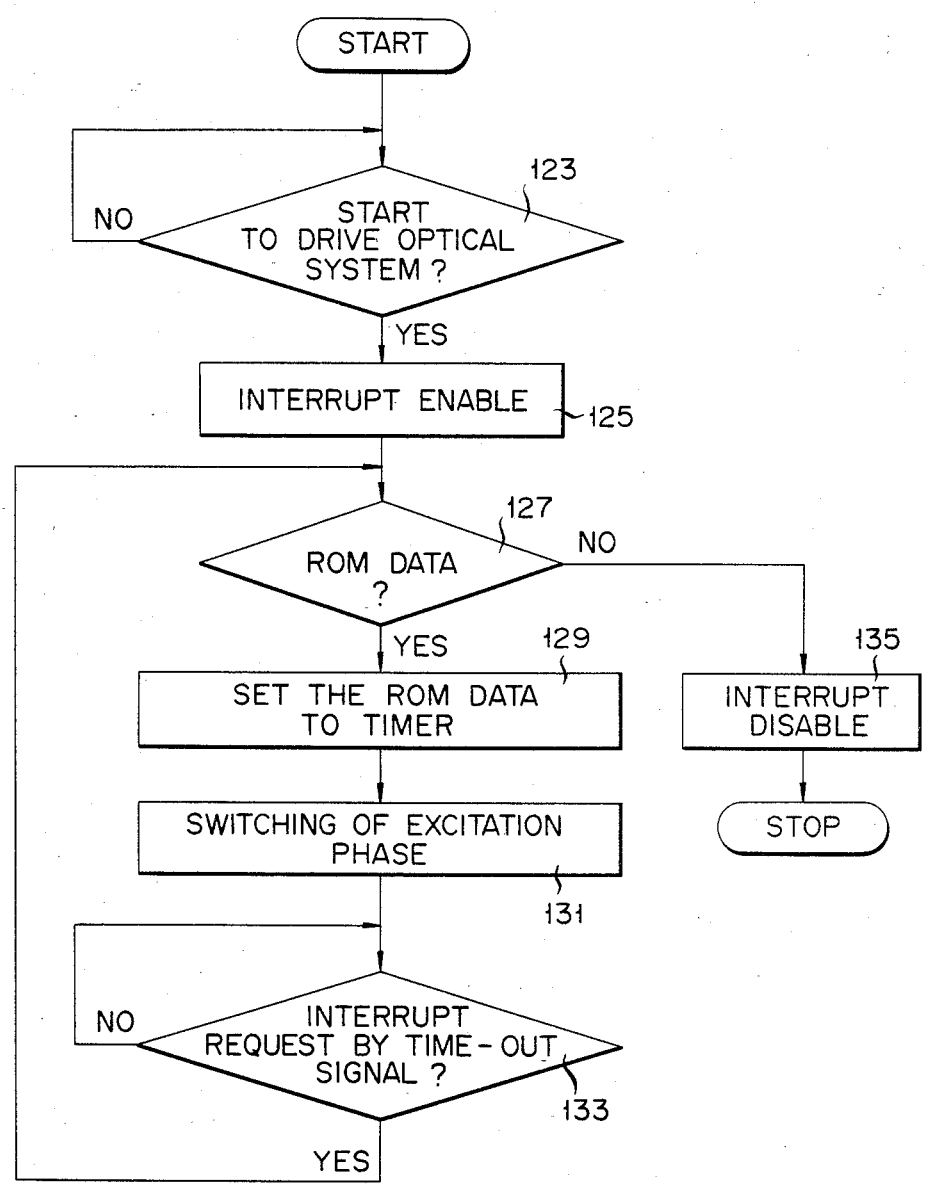
FIG. 14 is a flowchart explaining the mode of operation of the control circuit shown in FIG. 11.

The mode of operation of the control circuit shown in FIG. 11 of the configuration as described above will be described with reference to the flowchart shown in FIG. 14. If a drive start command for driving the optical system 45 is supplied in step 123, the microprocessor 111 establishes the interrupt enable state in step 125 to allow detection of a time-out signal from the timer 115 and to set a desired excitation phase at the output port 113. The microprocessor 111 reads out the data D0 (T0/Tp) from the ROM 117 in step 127, and sets it in the timer 115 in step 129. In step 131, the excitation phase of the pulse motor 109 is switched to drive the optical system 45 in the forward direction. When the data D0 is set in the timer 115, the timer sequentially counts down the set data D0 in response to the clock pulse supplied thereto. When the count of the timer 115 reaches "0", the timer 115 generates a time-out signal in step 133. This time-out signal is supplied to the microprocessor 111 as an interrupt request signal. Upon the reception of the time-out signal, the microprocessor 111 judges that the excitation time for the designated excitation phase has elapsed. Then, the microprocessor 111 sets the next excitation phase at the output port 113 while it reads out the data D1 (T1/Tp) corresponding thereto from the ROM 117. The readout data D1 is set in the timer 115 and the operation as described above is repeated. The above described control, as will be appreciated by those skilled in the art, is referred to as open loop control. After readout of the data stored in the ROM 117 is completed, the microprocessor 111 establishes the interrupt disable state in step 135.

In this manner, the data D0 through Dn is sequentially read out from the ROM 117 and the excitation phase is switched according to the readout data. The pulse motor 109 is driven accordingly, and control of acceleration, constant velocity drive and deceleration is performed as shown in FIG. 10. For acceleration, velocity control is performed so as to achieve the velocity characteristics as indicated by curve C shown in FIG. 9.

As a modification, a plurality of sets of pulse data for accelerating or decelerating the pulse motor 109 may be stored in the ROM 117 corresponding to the document scanning velocities of the optical system 45 in the equal size, reduced scale, and enlarged copying modes.

Figure 15:
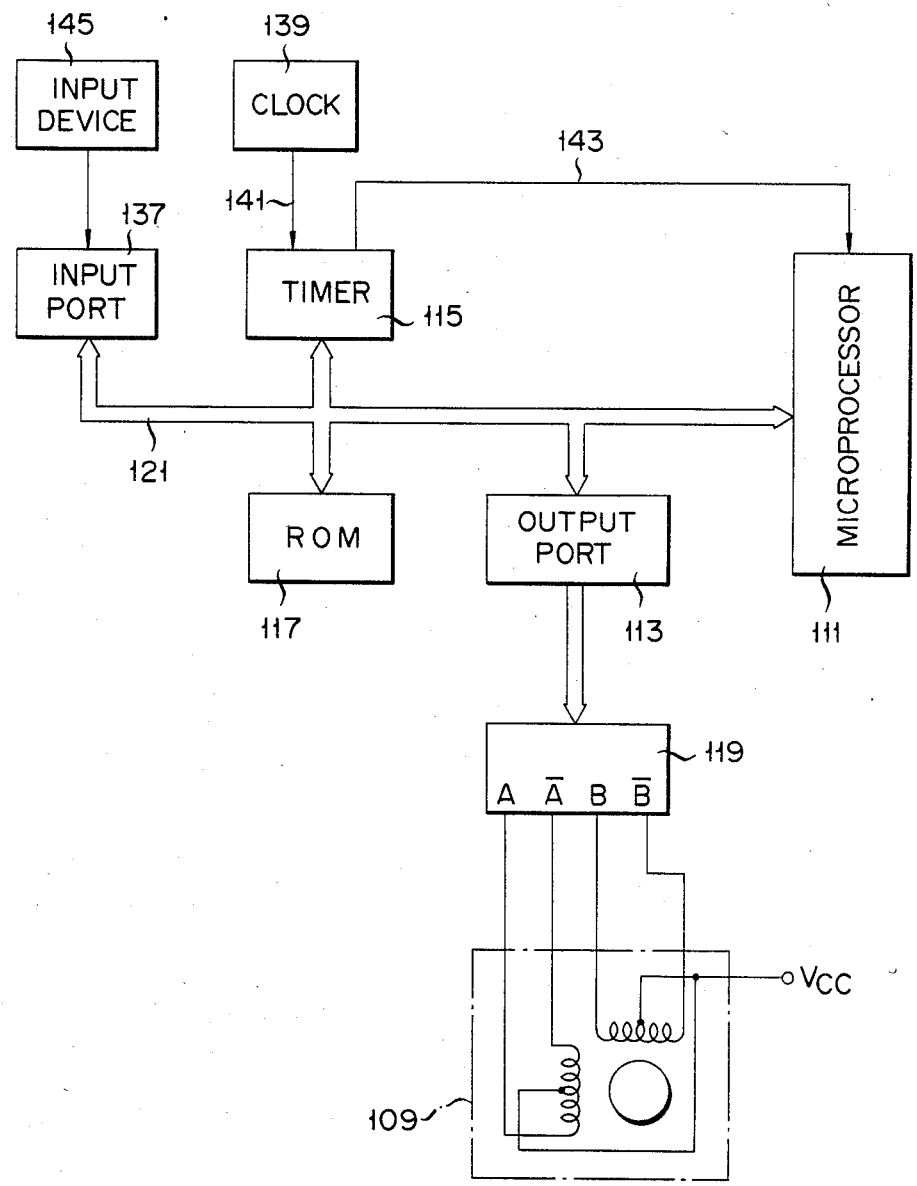
FIG. 15 is a block diagram of still another example of a control circuit for performing equal size, reduced scale, and enlarged reproduction of images with an image formation apparatus.

The document scanning velocity in the reduced scale copying mode must be faster than that in the equal size copying mode, while the document scanning velocity in the enlarged copying mode must be slower. There is a mechanical requirement that the distance from the initial position of the pulse motor 109 to the document scanning start position must be equal to that from the document scanning end position to the stop position. Thus, the acceleration ratios from the initial position of the pulse motor 109 to the document scanning start position and the deceleration ratios from the document scanning end position of the pulse motor 109 to the stop position of the pulse motor 109 are different for the equal size, reduced scale and enlarged copying modes. Therefore, a plurality of sets of pulse data for attaining different document scanning velocities must be stored. The control circuit as described above selects the pulse velocity data corresponding to the document scanning velocity of the optical system 45 from the plurality of pulse data stored in the ROM 117. The control circuit accelerates the pulse motor 109 from the initial position to the document scanning start position according to the pulse data selected. During document scanning, the control circuit keeps the pulse motor 109 at the constant velocity. From the document scanning end position to the stop position, the control circuit decelerates the pulse motor 109. FIG. 15 shows a circuit for attaining this. The same reference numerals used in FIG. 10 denote the same parts in FIG. 15. The ROM 117, the timer 115, the input port 137, and the output port 113 are connected to the microprocessor 111 which controls them through the data bus 121. The timer 115 is driven by a clock signal 141 generated by a clock generator 139. After each excitation phase switching time set elapses, the timer 115 generates a time-out signal 143 which is supplied to the microprocessor 111. An input device 145 comprising a digital switch or the like is connected to the input port 137. The input device 145 serves to designate the copying mode such as the equal size, reduced scale and enlarged copying modes. The output port 113 serves to switch the excitation phase of the pulse motor 109. The output from the output port 113 controls the driving circuit 119 for driving the pulse motor 109.

An example of the contents of the ROM 117 will now be described with reference to FIGS. 16 and 17. FIG. 16 shows an example of the velocity characteristics of the pulse motor 109. Referring to FIG. 16, the initial interval I1 is the accelerating interval, the next interval I2 is the constant velocity interval, and the final interval I3 is the decelerating interval. In the constant velocity interval, the pulse motor 109 is synchronous with the photosensitive drum 53 in the equal size copying mode. The position of the pulse motor 109 at the time of start of acceleration is defined as the initial position, and the position at the time of completion of deceleration is defined as the stop position. FIGS. 16 and 17 show the waveforms of the signals for the two-phase excitation method as an example of the excitation method for the pulse motor 109, wherein FIG. 16 corresponds to the equal size copying mode and FIG. 17 corresponds to the reduced scale copying mode.

Referring to FIG. 16, while clock pulses Tc of a certain period are generated, the excitation phase switching clock pulse Tn are pulses T1 through T4 whose period sequentially shortens within the accelerating interval I1 described above. In the constant speed interval I2, the excitation phase switching clock pulses Tn become pulses of a constant period. In the deceleration interval I3, the period of the excitation phase switching clock pulses Tn sequentially becomes longer. In general, the length of the excitation phase switching time corresponds to the rotation velocity of the pulse motor 109. Thus, if the excitation phase switching clock pulses Tn as described above are supplied, the rotation velocity of the pulse motor 109 is sequentially increased, kept constant after a predetermined period of time, and then sequentially decreased. The pulse motor 109 finally stops to provide the velocity characteristics as shown in FIG. 9. In the constant velocity interval, the rotation of the pulse motor 109 is synchronous with that of the photosensitive drum 53. In the case shown in FIG. 17, the periods of the excitation phase switching clock pulses in each interval are shortened to increase the rotation velocities of the pulse motor throughout the accelerating interval I1, the constant velocity interval I2, and the decelerating interval I3. Thus, the driving velocity of the optical system in the constant velocity interval I2 is made greater than that of the photosensitive drum so as to establish the reduced scale copying mode. Conversely, in order to establish the enlarged copying mode, the period of the excitation phase switching clock pulses must be elongated.

The ROM 117 thus stores the pulse data representing the velocity characteristics of the pulse motor 109 in each copying mode. The pulse data T1/Tc, T2/Tc, ... , Tn/Tc is obtained, for example, by dividing the period of the excitation phase switching clock pulses T1, T2, . . . , Tn by the period of the clock pulses Tc. If the initial data T1/Tc stored in the ROM 117 is designated by the microprocessor 111, this initial data T1/Tc is set in the timer 115. The timer 115 decrements the set data every time the clock pulse Tc is received. When the count of the timer 115 becomes "0", the timer 115 generates a time-out signal 143. In this manner, mode designation from the input device 145 effects selection of the corresponding pulse data and also control of the driving operation of the optical system according to this selected data.

In the embodiment shown in FIG. 15, the amount of rotation of the pulse motor 109 is controlled according to the equal size, reduced scale and enlarged copying modes. However, it is also possible to control the amount of rotation of the pulse motor 109 according to the document size set on the document table.

FIG. 18 shows an optical system driving device, which is driven in accordance with document size, to include a pair of carriage guide shafts 147 are mounted on the copying machine main body 35 parallel to each other. First and second carriages 149 and 151 are reciprocally movably fitted around the carriage guide shafts 147. As shown in FIG. 19, one end of each of the first and second carriages 149 and 151 is fitted around the carriage guide shaft 147 through round bushings 153, while the other end of each is fitted on the carriage guide shaft 147 through rectangular bushings 155 with their movement in the vertical direction prohibited. The lamp 39 and the first mirror 41 are mounted on the first carriage 149, while the second mirror 43 is mounted on the second carriage 151. Light emitted from the lamp 39 is radiated onto a document (not shown) fixed on a document table (not shown). The light reflected by the document then becomes incident on a lens (not shown) through the first and second mirrors 41 and 43. A first timing belt 157 is rotatably mounted over a pair of gears 159A and 159B so as to move the first and second carriages 149 and 151. The intermediate portion of the first timing belt 157 is coupled to the second carriage 151. A second timing belt 161 is rotatably mounted over a pair of gears 163A and 163B. In order to make the moving velocity of the second carriage 151 half that of the first carriage 149 and thus keep constant the length of the optical path from the first mirror 41 to the lens, the gear 159A is connected to a first speed change mechanism or first gear train 165, whereas the gear 163A is connected to a second speed change mechanism or second gear train 167 having a speed reduction rate twice that of the first gear train 165. These gear trains 165 and 167 are connected to first and second pulse motors 169 and 171 to be driven thereby. The numbers and pitches of the teeth of the gears 159A and 163A are made equal to each other. If the first and second gear trains 165 and 167 as described above are used in conjunction with the two pulse motors, the rotation velocities of the pulse motors 169 and 171 need not be separately controlled, so that the configuration of the pulse motor control means may be simplified. Since the timing belts and gears are used in combination, slipping is prevented, so that the misalignment arising from deviation of the relative speed of the carriages 149 and 151 may be completely prevented.

The embodiments described above are presented only for illustrative purposes, and the respective parts used therein may be replaced by other parts having similar functions. FIG. 20 shows a modification, whereby a slider 175 is mounted to the second carriage 151 through an interlink arm 173. The slider 175 is movably fitted at one end of the carriage guide shaft 147. The gears 159A and 159B are rotatably mounted at the sides of the slider 175 and of the second carriage 151 respectively. The intermediate portion of the first timing belt 157 mounted over the gears 159A and 159B is fixed to the copying machine main body 35. At the same time, the first carriage 149 is coupled to the intermediate portions of both first and second timing belts 157 and 159. Only the gear 163A is driven by the second pulse motor 171. In the arrangement shown in FIG. 20, when the pulse motor 171 is driven in the manner as described with reference to the former embodiment, the gears 159A and 159B function as the idlers. Therefore, the first carriage 149 is driven at a velocity twice that of the second carriage 151 without causing either vibration or shock. This means that only one pulse motor is required, thus achieving a simple and low-cost device.

What we claim is:

1. An image formation apparatus, of the table type, for reproducing an image of a document, comprising:
    scanning means for scanning a surface of the document in order to produce a latent image of the document, said scanning means including a movable optical system including movable reflectors;
    a pulse motor for driving said movable reflectors;
    mode selecting means for selecting reduced scale, equal size or enlarged copying modes to change a scanning velocity during formation of the latent image;
    memory means for storing pulse motor drive data corresponding to each of the reduced scale, equal size or enlarged copying modes selected by said mode selecting means;
    open loop controlling means having a timer, and being connected to said pulse motor, said mode selecting means and said memory means, for reading out from said memory means the pulse motor drive data corresponding to the reduced scale, equal size or enlarged copying mode which is selected by said mode selecting means, to permit the pulse motor drive data to be set to said timer, for controlling a rotation velocity of said pulse motor in an open loop fashion in accordance with the mode selected by said mode selecting means and for judging, upon detection of a time-out signal from said timer, that the excitation time for the excitation phase of said pulse motor has elapsed, for reading out from said memory means the pulse motor drive data corresponding to the next excitation phase and then for setting said pulse motor drive data, read from said memory means, to said timer;

hard copy reproducing means for reproducing said latent image of said document in hard copy form.

* * * * *